(12) United States Patent
Ekemar

(10) Patent No.: US 6,191,402 B1
(45) Date of Patent: Feb. 20, 2001

(54) APPARATUS FOR HEATING WITH A PULSATING ELECTROMAGNETIC NEAR FIELD

(75) Inventor: Lars Sven Erling Ekemar, Taby (SE)

(73) Assignee: Antrad System AB, Stockholm (SE)

( * ) Notice: Under 35 U.S.C. 154(b), the term of this patent shall be extended for 0 days.

(21) Appl. No.: 09/284,909

(22) PCT Filed: Aug. 18, 1998

(86) PCT No.: PCT/SE98/01477

§ 371 Date: Apr. 21, 1999

§ 102(e) Date: Apr. 21, 1999

(87) PCT Pub. No.: WO99/13688

PCT Pub. Date: Mar. 18, 1999

(30) Foreign Application Priority Data

Aug. 22, 1997 (SE) .................................................. 9703033

(51) Int. Cl.[7] .................................................. H05B 6/72
(52) U.S. Cl. ............................ 219/748; 219/756; 219/696
(58) Field of Search ..................................... 219/748, 756, 219/746, 745, 749, 695, 696, 697, 750

(56) References Cited

U.S. PATENT DOCUMENTS 3,221,132 * 11/1965 Staats ................................... 219/756
3,855,440 * 12/1974 Staats et al. .......................... 219/748

FOREIGN PATENT DOCUMENTS

WO 95/24818 * 9/1995 (WO) .

* cited by examiner

*Primary Examiner*—Philip H. Leung
(74) *Attorney, Agent, or Firm*—Fildes & Outland, P.C.

(57) ABSTRACT

An apparatus that enables a homogenous heating and an efficient measurement of organic as well as a mixture of organic and inorganic materials. The apparatus is characterized in that a load, placed in a cavity with very small dimensions in relation to the wavelength in vacuum at applied frequency, is heated by a generated pulsating near field.

16 Claims, 1 Drawing Sheet

APPARATUS FOR HEATING WITH A PULSATING ELECTROMAGNETIC NEAR FIELD

FIELD OF THE INVENTION

This invention relates to heating organic materials or mixtures of organic and inorganic materials and more particularly the heating with a pulsating electromagnetic near field.

BACKGROUND OF THE INVENTION

It is known in the art relating to heating to provide homogenous heating of materials which consist of organic or mixtures of organic and inorganic materials. The need for such heating is great. The materials may be made up of solid, or liquid as well as a mixture of solid and liquid components. The materials to be heated may be of both large and small volumes. For example, the preparation of foodstuff in the food industry, the cooking of food in restaurants and homes, the sterilization of offal, the rotting of wood fibers and the degradation drying and sterilization of sludge.

There are applications where a fast heating without appearance of hot spots or hot areas is a necessity. One example of such an application is the heating of cold blood in connection with blood transfusions in medical care.

In industrial processes such as the drying of wood, there is a need to measure and utilize changes in dielectric properties of the materials being heated.

Established heating techniques, such as heating with microwaves, heating with conventional heat radiation and heat convection commonly have heat absorption in a load that is characterized by little or no depth of penetration. The heating of the inner parts of a load will be done by heat transmission from the heat absorbing surfaces. In the most common dielectric materials, heat transmission is a slow process. As a consequence, large volumes of organic materials require a long time to achieve a homogenous heat distribution.

It is also previously known that dielectric materials can be heated by oscillating high frequency electric fields generated between a pair or pairs of electrodes. This technology has the disadvantage of not being flexible to accommodate differences in load geometry and load composition.

It is also known that it is possible to heat a dielectric load by emitting electromagnetic radiation from an antenna into a cavity with walls made of electrically conducting material.

Heating with microwaves in a resonant cavity has been established for many years. A resonant cavity has the advantage of making possible an even distribution of microwaves.

A resonant cavity of a microwave oven requires that the following certain physical conditions be met:
a. The infinite conductivity of the walls.

At frequencies above 900 MHz (micro wave frequencies), the currents in a cavity wall are concentrated at the surface. An approximation according to Maxwell's equations valid for the infinite conductivity of walls results in a negligible error. With decreasing frequency the skin depth increases. At frequencies below 300 MHz, the skin depth is so considerable that according to known technology a resonant cavity is not regarded as possible.
b. The design of the cavity.

The cavity walls shall have approximately infinite conductivity and the cavity shall meet required dimensions for a resonant cavity. For example, at least one length of one side of a rectangular cavity shall not be below half a wavelength. To obtain a resonant circular cavity, the diameter shall correspond to 0.76% of a wavelength. It is possible to obtain a homogenous distribution of microwaves in a cavity. However, microwaves have an insignificant depth of penetration. Thus, as to many different applications, particularly if the loads are thick, the result will be a superficial and inhomogeneous heating.

Heating in a resonant cavity at frequencies below 300 MHz has theoretically, as to many applications, considerable advantages for getting a fast and homogenous heating of large loads of dielectric materials. Due to reasons mentioned above, such cavity has been regarded as an impossibility.

SUMMARY OF THE INVENTION

The present invention provides a resonant cavity at frequencies below 300 MHz and a cavity that remains small and compact as well as big and capacious.

The invention is characterized in that a pulsating electromagnetic near field is generated in load and placed in a cavity with very small dimensions in relation to the wavelength in vacuum at applied frequency. A near field is defined as a field formed within less than a wavelength from an antenna.

Homogenous heating with high power efficiency is achieved for both small and large loads, provided the longest side of the cavity is delimited, i.e., the distance between two points in the cavity is less than half a wavelength in vacuum of any wavelength in vacuum conditioned by applied frequency.

Favorable heating will be obtained if the cavity space is delimited. The cubic root of the cavity space volume shall not exceed 25% of any wavelength in vacuum conditioned by applied frequency, preferably not exceed 20% of the cubic root of any wavelength in vacuum conditioned by applied frequency, and more preferably not exceed 15% of the cubic root of any wavelength in vacuum conditioned by applied frequency.

These and other features and advantages of the invention will be more fully understood from the following detailed description of the invention taken together with the accompanying drawings.

DETAILED DESCRIPTION OF THE INVENTION

Figure 1:
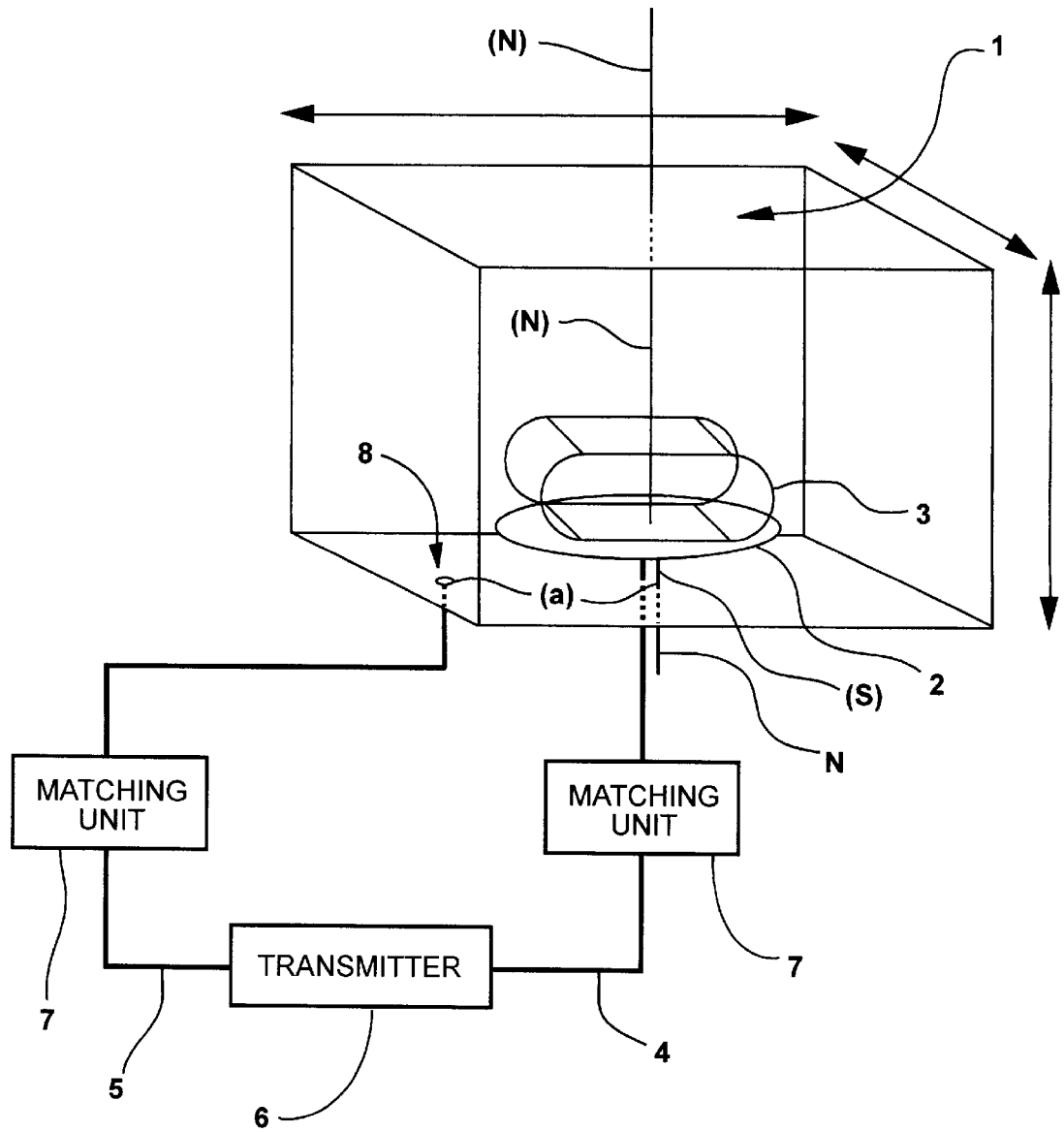
FIG. 1 is a schematic view of a heating apparatus in accordance to the invention.

Referring now to the drawings in detail, numeral 10 generally indicates an apparatus for heating. Between an antenna 2 and cavity 1 walls there is a phase difference. The magnitude of the phase difference between the antenna and the cavity depends on the choice of reference points at the antenna and the cavity. The phase difference ranges from a few degrees to 180 degrees.

Measurements show a very good heat distribution in the load 3. Computer simulations indicate very complicated field configurations. The electric and magnetic field patterns are not in accordance with the patterns valid for microwave ovens and for traditional dielectric heating.

The antenna/antennas enclosed by the cavity, generate in joint action with the cavity walls, pulsating electric and magnetic fields in the load. The load is heated with a very good homogeneity and a high power efficiency. Heat concentration referred to as hot spots or concentrated heat in the load surface does not occur. Characteristic of the invention is a unique interaction between antenna, cavity walls and the load situated in the cavity. This interaction makes possible a fast heating process.

The invention is also characterized in that the cavity, the load, the antenna, the matching and the frequency generator forms a resonant unit. The antenna, the cavity walls and the matching units shall, from no load to full load in the cavity, form an electrical length of half a wavelength or a multiple of half a wavelength in vacuum at applied frequency/frequencies. The favorable conditions remain if the aberration from a multiple of half a wavelength does not exceed +/−15% of half a wavelength, preferably does not exceed +/−10% of half a wavelength, and more preferably does not exceed +/−7% of half a wavelength.

Antenna performance is improved if the antenna surface facing the load space is covered by one or several layers or films of an electrical nonconductive material such as glass, aluminum oxide, zirconium oxide, ceramics, Teflon, Capton, etc. A layer may be constituted in many different ways. It may be an oxide film, a lose lying powder or a lose lying plate. The layer may touch the antenna and it may also adhere to the antenna. A layer may also be separated from the antenna by vacuum or air. The electrical or physical thickness of a layer/layers shall not exceed 3% of the wavelength, preferably not exceed 2% of the wavelength and more preferably not exceed 1.5% of the wavelength conditioned by the applied frequency.

The unique interaction between antenna, cavity and the load placed in the cavity makes the invention also very useful for providing parameters for process control of processes in dielectric materials as the drying of wood. The process may be carried out by heating with established technology.

The invention offers homogenous heating of dielectric materials without superheating in hotspots or surface zones. Thus, it is useful for demanding applications as the heating of cold blood intended for transfusions in medical care.

An apparatus in accordance with the invention generates heat in a load when the applied electromagnetic radiation is within the frequency range 50 kHz–299 MHz, preferably within the frequency range 100 kHz–299 MHz, more preferably within the frequency range 300 kHz–299 MHz, best of all 1 MHz–299 MHz.

FIG. 1 illustrates an apparatus in accordance to the invention. The apparatus has a cavity 1 with electrically conductive walls and at least one antenna 2 within the cavity. The antenna is connected to one of two outgoing connections 4 from a frequency generator (transmitter) 6, the cavity is connected to the other outgoing connection 5. The frequency generator 6 feeds through matching units 7, the antenna and the cavity with a current whose frequency is tuned to the antenna, cavity walls, matching units and the load 3. Within the cavity, the electromagnetic field generates heat in a load 3 which is placed in the cavity's load space. The load consists of at least one material with a dielectric and/or magnetic loss factor.

Characteristic of the invention is that one of the outgoing connections from the frequency generator is connected to the cavity with one or more connections. It is advantageous if the connection/connections 8 to the cavity walls is/are located in such way that the tangent plane of the average antenna surface facing the load space is situated between the load area and the connection 8 to the cavity.

If one connection to the cavity wall is used, it is advantageous if the connection 5 to the cavity wall is close to the normal (N) through the central point of the combined surface or surfaces of the antenna/antennas 7. The intersection point(s) is the point where the normal (N) cuts the cavity wall. The distance (a) along the cavity side/sides is the distance between the connection/connections 5 and the intersection(s). The distance (a) shall at applied frequency not exceed 15% of the corresponding wavelength in vacuum, preferably not exceed 12% of the corresponding wavelength in vacuum, and more preferably not exceed 10% of the corresponding wavelength in vacuum.

The power efficiency is improved if the antenna/antennas plane surface facing on the cavity's load space is kept below the coincident cavity's cross section plane with 45%, preferable 40%, still better 35% and best of all 30%.

It is also an advantage if the antenna/antennas plane surface facing on the cavity's load space has no sharp corners. Corners tangential to the antenna plane surface shall therefore have a radius exceeding 2%, preferably 3%, more preferably exceeding 4% of the largest distance of the coincident cross section area of the cavity.

It is particularly advantageous if the antenna/antennas plane surface facing on the cavity's load space is circular, oval or a polygon with more than five sides.

The load space is located on the opposite side of the antenna connection to the frequency generator. The load space is enclosed by the antenna plane surface and the cavity walls. A favorable field distribution in the load requires that the longest distance of the load space between the antenna and cavity walls does not exceed 30% of the wavelength in vacuum of applied wavelength in vacuum conditioned by applied frequency.

One test has been performed in an apparatus designed as described in FIG. 1. A 1500 gram roast of beef was placed in the cavity of the apparatus. A RF signal of 136 MHz with a power of 500 Watts was applied for two periods of 15 minutes. In the beginning, the meat temperature was 4° C. After 15 and 30 minutes respectively the average meat temperature had increased 30 and 70° C., respectively. Cross sections of the roast beef showed perfect red color from the steak skin to the center. Meat pieces in sizes from 100 gram up to several kilos have also been prepared.

The invention is also perfect for the measuring chemical changes in a load by establishing changes in resonant conditions. One example is the drying of wood. When wood is drying, the dielectric properties will be changed. The system is matched to a perfect resonant circuit. When the moisture content in the wood decreases, the resonance conditions are changed and standing waves will arise in the system.

By measuring the SWR (Standing Wave Ratio, the relationship between generator emitted power and from the system reflected power), the composition, for example the humidity of wood, can be measured. The composition can also be determined by measuring changes in impedance relationships. One example is that the characteristic impedance will decrease with decreased wood moisture.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An apparatus for heating dielectric materials with electromagnetic radiation within the frequency range of 50 kHz–299 MHz with one or more antennas placed in a cavity characterized in that the antenna/antennas enclosed by the cavity in joint action with cavity walls that enclose a load space for heating a load together generate pulsating electric and magnetic fields in a load and the longest side of the cavity is delimited in such way that the distance between a central point in the cavity defined by the combined surfaces of the antenna, and any other point in the cavity is less than half a wavelength in vacuum of any wavelength in vacuum conditioned by applied frequency.

2. Apparatus according in claim 1 characterized in that the cavity, the load, the antenna and matching units together with a frequency generator forms a resonant unit.

3. Apparatus according to claim 1 characterized in that the cubic root of the cavity space volume shall not exceed 25% of any wavelength in vacuum conditioned by applied frequency.

4. Apparatus according to claim 1 characterized in that the antenna, the cavity and matching units have, from no load up to full load, an electrical length of half a wavelength.

5. Apparatus according to claim 1 characterized in that the antenna, the cavity and matching units have, from no load up to full load, a multiple of half a wavelength at applied frequency.

6. Apparatus according to claim 1 characterized in that the largest distance within the load space between the antenna/antennas and the cavity does not exceed 30% of the wavelength in vacuum given by the applied frequency.

7. Apparatus according to claim 1 characterized in that wavelength deviation does not exceed +/−15% from a multiple of half a wavelength.

8. Apparatus according to claim 1 characterized in that an antenna surface facing the load space is covered by at least one layer of an electrical nonconductive material, the mutual electrical and physical thickness of the layer shall not exceed 3% of the wavelength in vacuum given by the applied frequency.

9. Apparatus according to claim 1 characterized in that one of the outgoing connections from the frequency generator is connected to the cavity with at least one connection.

10. Apparatus according to claim 1 characterized in that the tangent plane of the average antenna surface, facing the load space, is situated between the load space and at least one of the connection points to the cavity.

11. Apparatus according to claim 1 characterized in that a distance (a), along at least one of the sides of the cavity between at least one of the connection points and the intersection(s), at applied frequency, does not exceed 20% of the corresponding wavelength in vacuum.

12. Apparatus according to claim 1 characterized in that an antenna/antennas plane surface facing on the load space of the cavity is below a coincident cross section plane of the cavity by 45%.

13. Apparatus according to claim 12 characterized in that the antenna/antennas plane surface facing on the load space of the cavity is one of circular, oval and a polygon with more than five sides.

14. Apparatus according to claim 12 characterized in that corners tangential to the antenna plane surface have a radius exceeding 2% of the longest distance of the coincident cross section area of the cavity.

15. Apparatus according to claim 1 characterized in that chemical parameters are measured by measuring changes in the standing wave ratio.

16. Apparatus according to claim 15 characterized in that the changed composition is determined by measuring changes in impedance relationships.

\* \* \* \* \*